United States Patent Office 3,825,590
Patented July 23, 1974

3,825,590
HYDROXY-HYDROXYMETHYL-SUBSTITUTED
PHENYLALANINE DERIVATIVES
John T. Suh, Mequon, and Richard A. Schnettler, Brown Deer, Wis., assignors to Colgate-Palmolive Company, New York, N.Y.
No Drawing. Filed Feb. 25, 1972, Ser. No. 229,558
Int. Cl. C07c 101/72
U.S. Cl. 260—519          3 Claims

ABSTRACT OF THE DISCLOSURE

The compounds are hydroxy-hydroxymethyl-substituted phenylalanines which are useful as antihypertensive agents and chelating agents for heavy metal ions. A species disclosed is 3-hydroxymethyl tyrosine.

SUMMARY OF THE INVENTION

The compounds of the invention may be represented by the following formula:

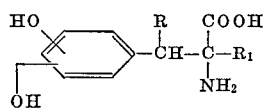

in which R and $R_1$ are hydrogen or lower alkyl of 1 to 4 carbons such as methyl, ethyl, isopropyl or butyl.

The compounds are preferably prepared by reduction of the corresponding formyl derivatives of the formula:

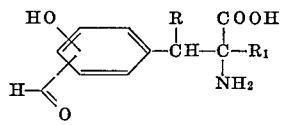

in which R and $R_1$ are as previously defined. The formyl derivatives may be prepared from known compounds by the methods described in the examples.

In the preferred practice, the hydrochloride salt of the corresponding formyl derivative is treated with a base such as potassium carbonate, to precipitate a solid which is dissolved in water and then hydrogenated in the presence of a suitable catalyst, such as platinum oxide, until the reaction is complete.

The described process may be illustrated as follows:

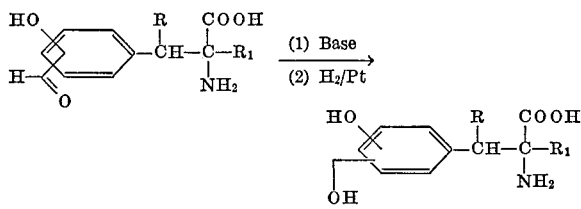

In the preferred process the hydrogenation is conducted at from 10° to about 40° C. at a hydrogen pressure of 20 to 80 p.s.i.

In addition to the described process, the α-methyl substituted compounds may be prepared by a process described in U.S. Pats. Nos. 3,478,058 and 3,478,059, which may be illustrated as follows:

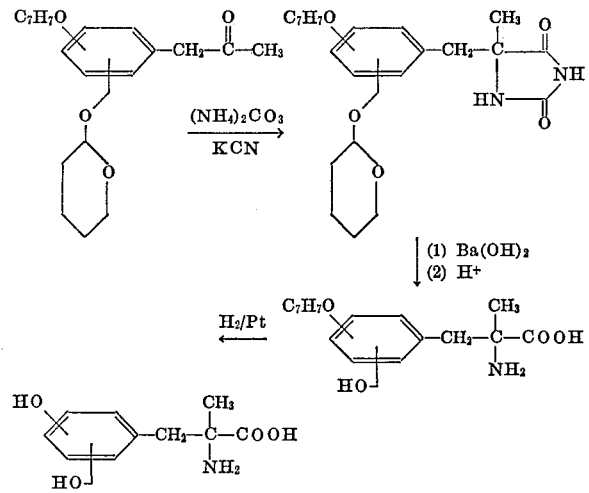

Representative of the ketones which may be prepared by the described and alternative processes are the following:

Methyl-(4-benzyloxy-3-hydroxymethyl-tetrahydro-pyranyl-ether-benzyl)-ketone,
Methyl-(3-benzyloxy-5-hydroxymethyl-tetrahydro-pyranyl-ether-benzyl)-ketone,
Methyl-(2-benzyloxy-3-hydroxymethyl-tetrahydro-pyranyl-ether-benzyl)-ketone, and
Methyl-(2-benzyloxy-6-hydroxymethyl-tetrahydro-pyranyl-ether-benzyl)-ketone.

Representative of the compounds which may be prepared by the described and alternative processes are the following:

3-Hydroxymethyl tyrosine,
α-Methyl-3-hydroxymethyl tyrosine,
3-Hydroxymethyl-5-hydroxyphenylalanine,
2-Hydroxymethyl-3-hydroxyphenylalanine,
2-Hydroxymethyl-6-hydroxyphenylalanine,
α-Methyl-3-hydroxymethyl-5-hydroxyphenylalanine,
α-Methyl-2-hydroxymethyl-3-hydroxyphenlalanine, and
α-Methyl-2-hydroxymethyl-6-hydroxyphenylalanine.

The compounds of the present invention may be employed as chelating agents in chemical processes in which it is desirable to inactivate heavy metal ions, especially ferric ions. The compounds can simply be dissolved in warm water and added to the aqueous mixture containing the heavy metal ions in an amount calculated to be sufficient to inactivate the ions.

In addition, the compounds possess antihypertensive activity. For example, the compound 3-hydroxymethyl tyrosine, when evaluated in the standard sodium pentobarbital anesthetized cat preparation, in an intravenous dose of 10 mg./kg., was found to lower the blood pressure. Oral doses of 100 mg./kg. of 3-hydroxymethyl tyrosine also lowered the blood pressure of spontaneous hypertensive rats for prolonged periods in excess of four hours.

Pharmaceutically acceptable salts of the novel compounds may be prepared by reacting the amino acid in a suitable mutual solvent with an acid such as formic acid, citric acid, maleic acid, sulfuric acid, hydrochloric acid, succinnic acid, tartaric acid, benzoic acid and fumaric acid.

When employed as pharmaceutical agents, the novel amino acids are preferably combined with conventional pharmaceutical diluents, flavoring agents, disintegrating and lubricant ingredients and formed into conventional oral unit dosage forms such as capsules, tablets and the like, and parenteral dosage forms such as solutions. Generally the tablets or capsules will contain 50 to 500 mg. of the active ingredients.

The number of tablets or capsules an individual patent may receive in a given 24 hour period will, of course, depend upon the amount of medication contained in the unit dosage form selected and the patient's condition.

The following examples illustrate the practice of the invention:

EXAMPLE 1

Diethyl-α-(4-acetoxy-3-formylbenzyl)-α-acetamidomalonate

In 100 ml. absolute ethanol is dissolved 1.46 g. (0.0635 mole) sodium. Diethyl acetaminomalonate (13.8 g., 0.0635 mole) is added and the mixture stirred at room temperature for 30 minutes. 4-acetoxy-3-formylbenzyl chloride (13.5 g., 0.0635 mole) is added as a dry solid and the mixture refluxed 2 hours. The suspension is evaporated to one-half its volume and filtered. The filtrate is taken to dryness and triturated several times with chloroform. Evaporation of the chloroform gives 24 g. oil which is chromatographed over 200 ml. silica gel ($CHCl_3$). A white solid is obtained which is crystallized from ethanol to give diethyl-α-(4-acetoxy-3-formylbenzyl)-α-acetamidomalonate as a white fluffy solid, m.p. 169–170°.

*Anal.*—Calcd. for $C_{19}H_{23}NO_7$: C, 58.00; H, 5.89; N, 3.56. Found: C, 58.05; H, 5.84; N, 3.89.

EXAMPLE 2

α-(3-Formyl-4-hydroxybenzyl)-2-acetamidomalonic acid

In 50 ml. water and 50 ml. ethanol is dissolved 10.0 g. (0.0252 mole) diethyl α-(4-acetoxy-3-formyl)-α-acetamidomalonate and 5.0 g. sodium hydroxide. The yellow solution is warmed on a steam bath for 10 minutes, after which the solvent is evaporated. The residue is dissolved in 100 ml. water and acidified to pH 3. After cooling, a white solid is obtained and dried (m.p. 158° with foaming) to give α-(3-formyl-4-hydroxybenzyl)-2-acetamidomalonic acid as colorless crystals.

*Anal.*—Calcd. for $C_{13}H_{13}NO_7$: C, 52.87; H, 4.44; N, 4.74. Found: C, 53.26; H, 4.56; N, 4.74.

EXAMPLE 3

3-Formyltyrosine hydrochloride

α - (3 - formyl - 4 - hydroxybenzyl) - 2 - acetamidomalonic acid (7.50 g., 0.0254 mole) is suspended in 60 ml. water and 10 ml. hydrochloric acid and refluxed one hour. The solvent is evaporated to about 5 ml., at which point the material crystallizes. This is cooled and collected with the aid of isopropanol:ether (1:1) as a rinse. A beige solid is collected which turns brown at about 270° but does not melt.

*Anal.*—Calcd. for $C_{10}H_{12}NO_4Cl$: C, 48.89; H, 4.93; N, 5.70. Found: C, 48.59; H, 4.69; N, 5.52.

EXAMPLE 4

3-Hydroxymethyl tyrosine

In 200 ml. water is dissolved 8.60 g. (0.0365 mole) 3-formyl-tyrosine hydrochloride. The solution is treated with Dowex IX–8 resin (OH−) until a negative chloride test ($AgNO_3$) is obtained. The solution is filtered free of resin and hydrogenated over platinum oxide for 11 hours, during which time approximately one-third of the theoretical hydrogen is taken up. The system (white flocculent precipitate) is filtered and the filtrate concentrated to 20 ml. and filtered. The filtrate is allowed to slowly evaporate in a 30 ml. beaker. The desired product deposits itself on the walls of the beaker to give 3-hydroxymethyl tyrosine as a beige solid which decomposes to brown solid above 200°.

*Anal.*—Calcd. for $C_{16}H_{13}NO_4$: C, 56.86; H, 6.20; N, 6.63. Found: C, 56.80; H, 6.49; N, 6.52.

EXAMPLE 5

α-Methyl-α-nitro-β-(4-acetoxy-3-formylphenyl)-ethyl propionate

In 20 ml. absolute ethanol is dissolved 0.78 g. (0.034 mole) sodium followed by 5.0 g. (0.034 mole) ethyl α-nitropropionate. A white solid precipitates from the solution. To the slurry 7.21 g. (0.034 mole) 4-acetoxy-3-formylbenzyl chloride is added in 50 ml. absolute ethanol. The solution is stirred at 65° C. for 15 hours and the solvent evaporated. The residue is extracted with ether, washed with water and dried. Evaporation of the solvent affords an oil which on chromatography over silica gel affords α-methyl-α-nitro-β-(4 - acetoxy-3-formylphenyl)-ethyl propionate.

EXAMPLE 6

α-Methyl-3-hydroxymethyltyrosine

The α - methyl-3-hydroxymethyltyrosine compound is prepared by standard methods of reduction and hydrolysis of α-methyl-α-nitro-β-(4 - acetoxy-3-formylphenyl)-ethyl propionate, the compound of Example 5.

EXAMPLE 7

Methyl-(4-benzyloxy-3-hydroxymethyltetrahydropyranyl-ether-benzyl)-ketone

In 10 ml. tetrahydrofuran are placed 5.0 g. (0.133 mole) 4 - benzyloxy-3-hydroxymethyltetrahydropyranyl-ether-1-bromobenzene and 0.323 g. (0.0133 mole) magnesium. The mixture is refluxed 15 hours, after which the magnesium is dissolved. To the refluxing solution 1.23 g. (0.0133 mole) chloroacetone is added and the refluxing is continued for 1 hour. The mixture is cooled and 100 ml. ammonium chloride solution added. Extraction with ethyl acetate, washing with water, and evaporation of solvent gives an oil whose IR spectrum exhibits carboxyl stretching at 5.87 microns.

Hydantoin formation with ammonium carbonate and potassium cyanide followed by hydrolysis affords α-methyl-3-hydroxymethyltyrosine.

EXAMPLE 8

3-Formyltyrosine

In 50 ml. water are dissolved 9.968 g. (0.0406 mole) 3-formyltyrosine hydrochloride and 2.820 g. (0.0203 mole) potassium carbonate is slowly added. A yellow solid precipitate is collected and washed with 50 ml. water and collected on the funnel to give 3-formyltyrosine as a yellow solid.

EXAMPLE 9

3-Hydroxymethyltyrosine

In 250 ml. water is dissolved 2.50 g. (0.0119 mole) 3-formyltyrosine with the aid of heat. The yellow solution is cooled and charged with 0.3 g. platinum oxide and hydrogenated at 50 p.s.i. for 2 hours. At the end of this time it is noted that a white precipitate (not product) has formed. The system is filtered and the clear aqueous solution charged with another 0.3 g. platinum oxide and rehydrogenated at 50 p.s.i. for 2 hours. The catalyst and more white precipitate are removed by filtration and the aqueous solution concentrated to 50 ml., filtered and allowed to air evaporate. The white solid is triturated with 25 ml. water, filtered, and the aqueous solution allowed to again evaporate. The solid residue (now completely water soluble) is ground to a fine powder and boiled with 100 ml. absolute ethanol and the solid collected and dried to give 3-hydroxymethyltyrosine as a beige solid which does not melt above 360°.

*Anal.*—Calcd. for $C_{10}H_{13}NO_4$: C, 56.86; H, 6.20; N, 6.63. Found: C, 56.91; H, 6.29; N, 6.49.

We claim:

1. A compound selected from the group consisting of compounds of the formula

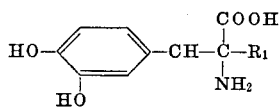

in which $R_1$ is hydrogen or methyl, and pharmaceutically acceptable salts thereof.

2. A compound of claim 1 which is 3-hydroxymethyltyrosine.

3. The compound of claim 1 which is α-methyl-3-hydroxymethyltyrosine.

References Cited

UNITED STATES PATENTS

| 3,725,470 | 4/1973 | Bretschneider et al. | 260—519 |
| 3,372,300 | 3/1973 | Lunts et al. | 260—519 |
| 3,763,218 | 10/1973 | Kaiser et al. | 260—519 |

FOREIGN PATENTS

| 1,068,937 | 5/1967 | Great Britain | 260—519 |
| 2,122,485 | 11/1971 | Germany | 260—519 |

LORRAINE A. WEINBERGER, Primary Examiner

P. J. HAGAN, Assistant Examiner

U.S. Cl. X.R.

260—309.5 345.9; 424—319